UNITED STATES PATENT OFFICE.

WILLIAM E. ANDREW, OF NEW YORK, N. Y.

IMPROVEMENT IN ARTIFICIAL BUTTER.

Specification forming part of Letters Patent No. 166,955, dated August 24, 1875; Reissue No. 8,048, dated January 22, 1878; application filed December 29, 1877.

*To all whom it may concern:*

Be it known that I, WILLIAM E. ANDREW, of the city, county, and State of New York, have invented certain new and improved processes of making a new product resembling butter from the oils of animal fats, as will be hereinafter described.

The nature and objects of my invention may be stated as follows: The nature of my invention relates to a new process or processes for obtaining from animal oil a new product useful for culinary or other purposes, and, further, in combining said new product with milk, cream, or butter, and obtaining by said combination an artificial butter of superior quality.

My invention consists, first, in refrigerating animal oil after proper churning or agitating to rupture the oil-globules, and when in that condition it is subjected to a low temperature, where it congeals before it has the opportunity to again assume the globular form; second, the product obtained by refrigerating or otherwise congealing animal oil the globules of which have been ruptured by suitable agitation or churning, being refrigerated at or nearly the same time, when the oil is in a state of agitation; the product then assumes a glossy and butter-like appearance, and avoids being of a granular or crumbly consistency; third, in manufacturing artificial butter by first rupturing and destroying the globular condition of animal oil by agitation, and then refrigerating the same, and combining the new product thus obtained with butter, cream, or milk, and churning or agitating the mass until a thorough amalgamation is effected, and, finally, treating the last product as ordinary dairy-butter; fourth, in the artificial butter obtained by this process, consisting of the globule-ruptured animal oil, congealed at low temperature, combined and churned with butter, cream, milk, or their equivalent, whereby it attains the consistency and quality of cream-made butter.

I take a quantity of oil—say about one hundred pounds—after it has been carefully prepared, which must be pure, odorless, and sweet, at a temperature of about 70° or 80° Fahrenheit, and place it in a churn or other suitable agitating apparatus, which will effect the result sought; and after supplying a proper quantity of coloring matter and enough salt to set the color, I subject it to a rapid agitation or churning until the oil-globules are thoroughly and completely ruptured, when it is conveyed automatically, or otherwise removed from the churn or agitating apparatus, to a suitable receptacle containing pulverized ice or cold water, and stirred through the same until it is congealed to about the consistence of genuine butter, which will congeal the oil before the oil-globules have time to again unite or assume their original character.

The mechanical means for effecting this are obvious, and many well-known devices may be used. For instance, a churn or other agitating apparatus calculated to give rapid and efficient agitation may be provided near its lower surface with a let-off cock, which will lead into a suitable receptacle on a lower level, where ice, pulverized ice, or its equivalent, may be used for the congealing process, and suitable drainage supplied, as may be easily arranged.

The refrigerating process herein described has for its object the rapid changing of the temperature to at once congeal the oily mass, which, after having been churned or otherwise agitated, as described, and before it is refrigerated, becomes of a different appearance, owing to the complete breaking up of the oil-globules; and while in this condition, by a thorough and quick refrigeration, it is at once converted into a new product, which has the quality and appearance of natural butter.

In this condition I find it very useful for culinary purposes, pastry, &c., and, if properly worked and sufficiently salted, it could be kept sweet any length of time for such or other purposes.

The great desideratum in this art has been to manufacture an artificial butter from the oils of animal fat that would have the consistence and adhesiveness and all the qualities of cream-butter, and to avoid the crumbling and granular texture, which is very detrimental if not removed.

In the condition and by the process I have described, I find that, the oil-globules being broken up and quickly congealed while in such a condition, I obtain a product free from grain or granular appearance, with a smooth, glossy, and butter-like texture, resembling butter in every respect, except in flavor, which can readily be supplied by combining it with cream, milk, or butter from cream, or their equivalent, and thoroughly mixed.

To effect this last result and obtain an artificial butter of excellent quality, I take a sufficient quantity of cream or milk that would make about fifteen pounds of butter, and churn it until the butter is formed, or nearly so, and then add about one hundred pounds of the new product above described, or about the same percentage, according to the quality of butter sought, with the butter so produced from cream or milk, or their equivalent, and subject the entire mass to agitation or churning until a thorough amalgamation takes place, and the mass is homogeneous, when it may be taken from the churn or agitating apparatus, placed on trays, worked, and salted, as practiced in ordinary dairy butter-making; or it may be again subjected to a low temperature to congeal, or until it reaches a desired state, and afterward treated to suit.

I do not confine myself to any particular form or methods of churning or agitating or preparing the oil for churning or agitating, as all I require is to completely rupture or break up the oil-globules, and then refrigerate to prevent them from again forming or assuming their globular or granular form. This result may be accomplished by churning or agitating with the oil, milk, cream, or butter, and then refrigerating to at once congeal the entire mass, without departing from my invention.

What I claim as my invention, and desire to secure by Letters Patent, is—

1. The process of refrigerating animal oil after its globules have been ruptured by churning or otherwise agitating, as specified.

2. The new product herein described, having the consistence and appearance of butter, consisting of animal oil, refrigerated or congealed after the oil-globules have been ruptured, as herein specified.

3. The complete process of manufacturing artificial butter herein described, consisting, first, in rupturing and destroying the globular condition of animal oil by agitation, and then refrigerating the same, then combining the product thus obtained with butter, cream, or milk, and churning until a thorough amalgamation takes place, as specified.

4. The artificial butter described, consisting of the globule-ruptured refrigerated animal oil, combined and amalgamated with butter, cream, or milk, as specified.

WILLIAM E. ANDREW.

Witnesses:
ROBT. W. SCOTT,
M. MCN. WALSH.